(12) United States Patent
Presse

(10) Patent No.: US 9,315,274 B2
(45) Date of Patent: Apr. 19, 2016

(54) METHOD AND SYSTEM FOR REGULATING POWER IN THE EVENT OF AT LEAST ONE AIRCRAFT ENGINE FAILURE

(71) Applicant: TURBOMECA, Bordes (FR)

(72) Inventor: Jean-Michel Presse, Aressy (FR)

(73) Assignee: TURBOMECA, Bordes (FR)

( * ) Notice: Subject to any disclaimer, the term of this patent is extended or adjusted under 35 U.S.C. 154(b) by 140 days.

(21) Appl. No.: 14/354,376

(22) PCT Filed: Nov. 23, 2012

(86) PCT No.: PCT/FR2012/052715
§ 371 (c)(1),
(2) Date: Apr. 25, 2014

(87) PCT Pub. No.: WO2013/076434
PCT Pub. Date: May 30, 2013

(65) Prior Publication Data
US 2014/0303871 A1 Oct. 9, 2014

(30) Foreign Application Priority Data
Nov. 25, 2011 (FR) ...................................... 11 60785

(51) Int. Cl.
*G06F 19/00* (2011.01)
*G06G 7/70* (2006.01)
(Continued)

(52) U.S. Cl.
CPC ................ *B64D 31/00* (2013.01); *B64D 31/06* (2013.01); *B64D 41/00* (2013.01); *F02C 9/00* (2013.01); *F05D 2270/09* (2013.01); *Y02T 50/53* (2013.01)

(58) Field of Classification Search
CPC ....................................................... B64D 31/00

USPC .......................................................... 701/100
See application file for complete search history.

(56) References Cited

U.S. PATENT DOCUMENTS 4,684,081 A 8/1987 Cronin
5,161,363 A 11/1992 Klaass et al.
(Continued)

FOREIGN PATENT DOCUMENTS

EP 2 347 956 A2 7/2011

OTHER PUBLICATIONS

International Search Report issued Oct. 21, 2013, in PCT/FR2012/052715, filed Nov. 23, 2012.

*Primary Examiner* — Helal A Algahaim
*Assistant Examiner* — Mahmoud Ismail
(74) *Attorney, Agent, or Firm* — Oblon, McClelland, Maier & Neustadt, L.L.P.

(57) ABSTRACT

A method to optimize resources needed to continue flight if at least one main engine is lost, by relieving a propulsion system that has remained operative of all or some of non-propulsive energy demands, by additional generation of non-propulsive power, operating continuously. The method uses a GPP unit that operates constantly in flight while taking up some of nominal total non-propulsive power of the aircraft, to supply increased non-propulsive power almost instantaneously, based on at least three respective emergency regimes at a time of engine failure. A control and monitoring function of the GPP calculates elapsed time for each emergency regime, and informs a data processing unit thereof, while emitting an alarm if operating periods allocated to each emergency regime are exceeded, and the emergency function adjusts non-propulsive power demands made by the aircraft between main engines and the unit GPP either automatically or on orders of a pilot.

10 Claims, 5 Drawing Sheets

Figure 1:
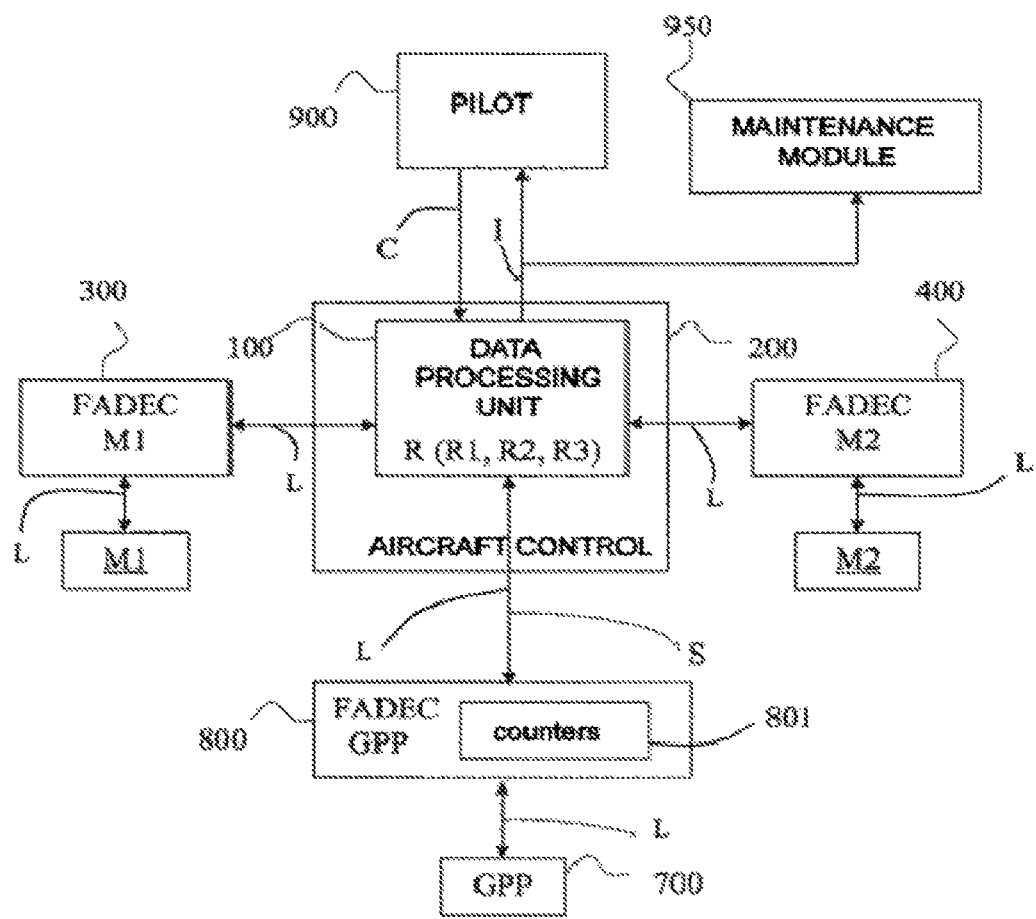

(51) Int. Cl.
 *B64D 31/00* (2006.01)
 *B64D 41/00* (2006.01)
 *B64D 31/06* (2006.01)
 *F02C 9/00* (2006.01)

(56) References Cited

U.S. PATENT DOCUMENTS

| | | | |
|---|---|---|---|
| 5,343,778 A | 9/1994 | Romero et al. | |
| 5,408,821 A | 4/1995 | Romero et al. | |
| 6,316,841 B1 | 11/2001 | Weber | |
| 8,118,253 B1 | 2/2012 | Casado Abarquero et al. | |
| 2009/0156068 A1* | 6/2009 | Barrett | B63H 21/20 440/3 |
| 2009/0306836 A1* | 12/2009 | Ausman | G01D 7/00 701/3 |
| 2010/0294877 A1* | 11/2010 | Jianu | B64C 29/0025 244/2 |
| 2011/0084550 A1* | 4/2011 | Nierlich | B64C 25/30 307/9.1 |
| 2012/0318914 A1* | 12/2012 | Rajashekara | B64D 41/00 244/58 |

* cited by examiner

METHOD AND SYSTEM FOR REGULATING POWER IN THE EVENT OF AT LEAST ONE AIRCRAFT ENGINE FAILURE

TECHNICAL FIELD

The invention relates to a method and a system for regulating power in the event of the failure of at least one aircraft engine.

The invention applies to the traction system of aircraft, in other words essentially both the traction system of aeroplanes (jet engines, turbojet engines, turboprop engines) and the traction system of helicopters (turboshaft engine).

Put simply, an aircraft engine conventionally comprises a compressor/combustion chamber/turbine assembly forming a gas generator. After combustion, the hot compressed gases are expanded in the turbine, which drives the compressor mechanically via a high-pressure (abbreviated to HP) shaft, to form the HP body. These gases therefore generate propulsive power and also, in nominal AEO operating conditions (abbreviation of "all engines operating"), non-propulsive, i.e. electrical and/or pneumatic, power.

The energy thus provided during the period corresponding to a level of instantaneous power transmission. In the case of an aeroplane, the propulsive power is generated in the form of thrust either directly (within the jet engines) or indirectly via a low-pressure body BP (in fan-type turbojet engines or airscrew-type turboprop engines). In the case of a helicopter, the propulsive power is transmitted to the rotary wing by means of a power transmission box (generally known in French as a BTP).

In an engine failure regime (OEI, the abbreviation of "One Engine Inoperative"), the engine(s) remaining operational maintain propulsion and generate non-propulsive power for the aircraft. In the case of an "all-electric" or mainly electric aircraft, pneumatic generation gets its electrical power from electrical generation via appropriate converters.

PRIOR ART

In general, in the event of the loss of a propulsion engine, i.e. in an OEI regime, the engine(s) remaining operational compensate(s) at least partly for this loss so as to maintain both the propulsion of the aircraft and the generation of non-propulsive power. However, although the engines are oversized so as to provide surplus power in particular circumstances, for example in the OEI regime, it seems that this power is insufficient to ensure propulsion as well as restoration of acceptable flight conditions in all phases of flight, and also all the non-propulsive power demands required for the consumers (cabin air conditioning, landing gear etc.). In particular, the scale of the demands may limit the capacity for acceleration during transitional phases.

One solution is for the APU of the aircraft to give at least partial assistance to the traction system remaining operational or "surviving". APUs (the abbreviation of "auxiliary power unit") are commonly fitted to aircraft to power the various pieces of consumer equipment (electrical, pneumatic and hydraulic) while on the ground, and to start the main engines.

An APU is a "simplified" turbojet engine: conventionally, it consists of a gas generator and means for directly driving equipment on the aircraft (load compressor, electrical generator and/or electrical starter/generator etc.), or via a power transfer box with adjustment of rotational speeds. Air taken off at the outlet of the load compressor or the intake compressor can be used for main engine air start.

When an engine has broken down, some APUs have sufficient back-up that they can be restarted during flight in order to attempt to restart the failed engine and/or supply part of the electrical power to the equipment while in flight.

However, using an APU in flight means that it has to be restarted, and requires the aircraft to descend below a given altitude, to allow it to generate sufficient pneumatic power. If the aircraft has to stay above that altitude, for example because of flight conditions, all pneumatic power is still supplied by the surviving engine(s).

The activation of the APU thus results in several drawbacks: restarting the APU requires additional work load and monitoring at a time when the pilot has to retain all his concentration; the APU has a restart time of around 90 seconds, which means that it cannot be of immediate assistance; modified flight plan, with a lower ceiling than the maximum permitted if a main engine is lost, to allow the APU to generate sufficient pneumatic power; if the aircraft has to remain above a certain altitude, the APU supplies only electrical power and the surviving engine(s) is/are not completely relieved of power demands.

DESCRIPTION OF THE INVENTION

The aim of the invention is to eliminate these drawbacks. To achieve this, the power contributed is supplied by generation of additional non-propulsive power, operating constantly, and produced by an additional, engine-class main power unit (abbreviated to GPP for "groupe de puissance principal" in French). A power unit is described as engine-class when the architecture and performance of the power generated is suitable for certification as an engine for use in all flight phases, on the same basis as the generation of power supplied by a main aircraft engine. A GPP comprises a gas generator, with dimensions intermediate between a conventional APU and a main aeroplane engine.

The generation of additional power of the GPP type is calculated so that it can promptly take up all or some of the non-propulsive power requirements of the aircraft. The constant use of a GPP can be adjusted depending on whether the requirements are both pneumatic and electrical, or mainly electrical, for example when the cabin air conditioning is powered electrically. Moreover, compared with APU equipment, the flight altitude of an aeroplane in OEI regime can be increased up to a maximum permitted ceiling for the OEI regime when the aeroplane is equipped with a GPP unit.

More specifically, the subject-matter of the present invention is a method for regulating power in the event of at least one aircraft engine failure. The aircraft comprises a central digital data processing unit providing an emergency function capable of triggering an emergency signal. The method therefore consists in using the engine-class main power unit, known as GPP, managed by a control and monitoring function and operating constantly in flight, while taking up some of the nominal total non-propulsive power of the aircraft, to extend its operational limits on receipt of the emergency signal in order to be able to supply increased non-propulsive power almost instantaneously, on the basis of at least three emergency regimes at the time of said engine failure in response to increased consumption demands on the GPP. Each emergency regime has a maximum activation period, which can be carried over from one regime to the other and can be distributed over several alternate sequences. These regimes comprise at least, classified in order of decreasing power level: what is known as a super-emergency regime where all or some of the non-propulsive power plus additional power is taken over, what is known as a maximum emergency regime, where all or some of the non-propulsive power is taken over, and what is known as an intermediate emergency regime, where a minimal fraction of non-propulsive power is taken over, corresponding to the power remaining constantly available up to the end of the flight. The GPP control and monitoring function calculates the elapsed time for each emergency regime, and informs the data processing unit thereof, while emitting an alarm if the maximum operating periods allocated to each emergency regime are exceeded. Moreover, the emergency function adjusts the non-propulsive power demands made by the aircraft between the main engines and the GPP unit, either automatically or on the orders of the pilot, on the basis of this information about elapsed time in a regime and of a warning that the limit for using an emergency regime has been exceeded.

Advantageously, the activation periods of the regimes are used on the basis of managing the loss of one or more engines. A lower power regime can be used in place of an available higher power regime for a given period: the super-emergency regime is reached only in the phase of attempting to restart an engine, the maximum emergency regime is reached if one or more engines has failed, for example in the phase of recovering aircraft trajectory and/or altitude, while simultaneously supplying all or some of the non-propulsive power of the aircraft. The intermediate emergency regime can be activated only in the phase of maintaining a fraction of the non-propulsive power, in the event that at least one engine fails completely during an end-of-flight period, by relieving as much of the load on the remaining operational engines as possible.

In particular, the intermediate emergency power regime is compatible with regulated navigation along air routes remote from an emergency airport, particularly in the case of distress: this refers to the international ETOPS regulations (abbreviation of "Extended-Range Twin-Engine Operations Performance Standard") or any future regulations applying to all types of aeroplane.

According to particular embodiments, in the event of the failure of just one of the engines of an aircraft that supply non-propulsive power when operational, a regulation mode consists in calling upon only the intermediate emergency regime of the GPP unit, to compensate for the lack of contribution from the failed engine (M1) while the operational engine(s) is/are not relieved of its/their contribution to the total non-propulsive power.

Alternatively, three regimes can be called upon successively and alternately in another regulation mode, with the operational engine(s) being relieved of its/their contribution to the non-propulsive power until the failed engine has restarted, i.e. an alternative sequence of maximum emergency regime, where at least some of the non-propulsive power is taken over, followed by a demand for power corresponding to the super-emergency regime when an attempt is made to restart the failed engine for no longer than the whole available period allocated to that regime, before reverting to the maximum emergency regime with the total non-propulsive power being taken over as before, it being possible for the latter regime to last until the available period allocated to that regime has elapsed.

Then, if the failed engine is restarted, the emergency function adjusts the non-propulsive power between the two engines and the GPP unit, which operate again in the restored nominal non-propulsive power regime until the end of the flight, with a given portion of that power supplied by the GPP unit and the additional portion supplied by the two engines (M1, M2). Alternatively, if the failed engine does not restart, the emergency function stops relieving the demands on the operational engine, restoring its contribution to the non-propulsive power at that time, either automatically on the basis of the flight data or on the orders of the pilot if he considers that the flight regimes so permit, and calls upon the GPP unit in the intermediate emergency regime until the end of the flight.

Advantageously, the aeroplane thus has additional resources with the GPP unit to regain acceptable flight regimes by temporarily relieving the demands on the remaining operational engine.

If two engines have failed, a regulation mode performed by the emergency function consists in calling upon the alternative sequence as described above, activating the maximum emergency regime, followed by the super-emergency regime while an attempt is made to restart the engine, before returning to the maximum emergency regime. Then, if the engine is restarted, and either on the orders of the pilot if he considers that the flight regimes so permit, or automatically on the basis of the flight data, the emergency function diverts some consumers to the restarted engine (M2), which supplies its share of non-propulsive power, and other consumers to the GPP unit, which operates in the intermediate emergency regime (RI) until the end of the flight.

Alternatively, if the engine does not restart, the maximum emergency regime is called upon until its activation period has elapsed, then the demand for non-propulsive power is reduced by the emergency function so as to switch to the intermediate emergency regime.

Optionally, when the whole of the non-propulsive power is supplied only by the GPP unit in the intermediate emergency regime, an RAT (abbreviation of "Ram Air Turbine") can provide additional non-propulsive power.

The invention also relates to a system for regulating power in the event of the failure of at least one aircraft engine. This system comprises a flight control centre known as an aircraft control, equipped with a digital data processing unit, an aircraft maintenance module, and control and monitoring modules known as FADEC for a GPP unit and for the engines. The FADEC of the GPP unit is equipped with elapsed time counters for the emergency regimes triggered by an emergency function of the processing unit, which adjusts the supply of non-propulsive power by the GPP unit and the engines via their FADECs. Bidirectional links connect the aircraft control centre to the FADECs and these FADECs to the GPP unit and to the engines, so that they can manage the demand from the consumers on the basis of said elapsed times and the information on the state of the engines and the GPP unit, supplied by the FADECs to the maintenance module and to the pilot via the processing unit.

Advantageously, said elapsed times and information on the power levels reached and the state of the engines and the GPP unit, supplied by the FADECs to the maintenance module via the processing unit, allow optimised preventive maintenance and easy planning of the maintenance operations in the event that the GPP unit is damaged.

PRESENTATION OF THE FIGURES

Figure 2:
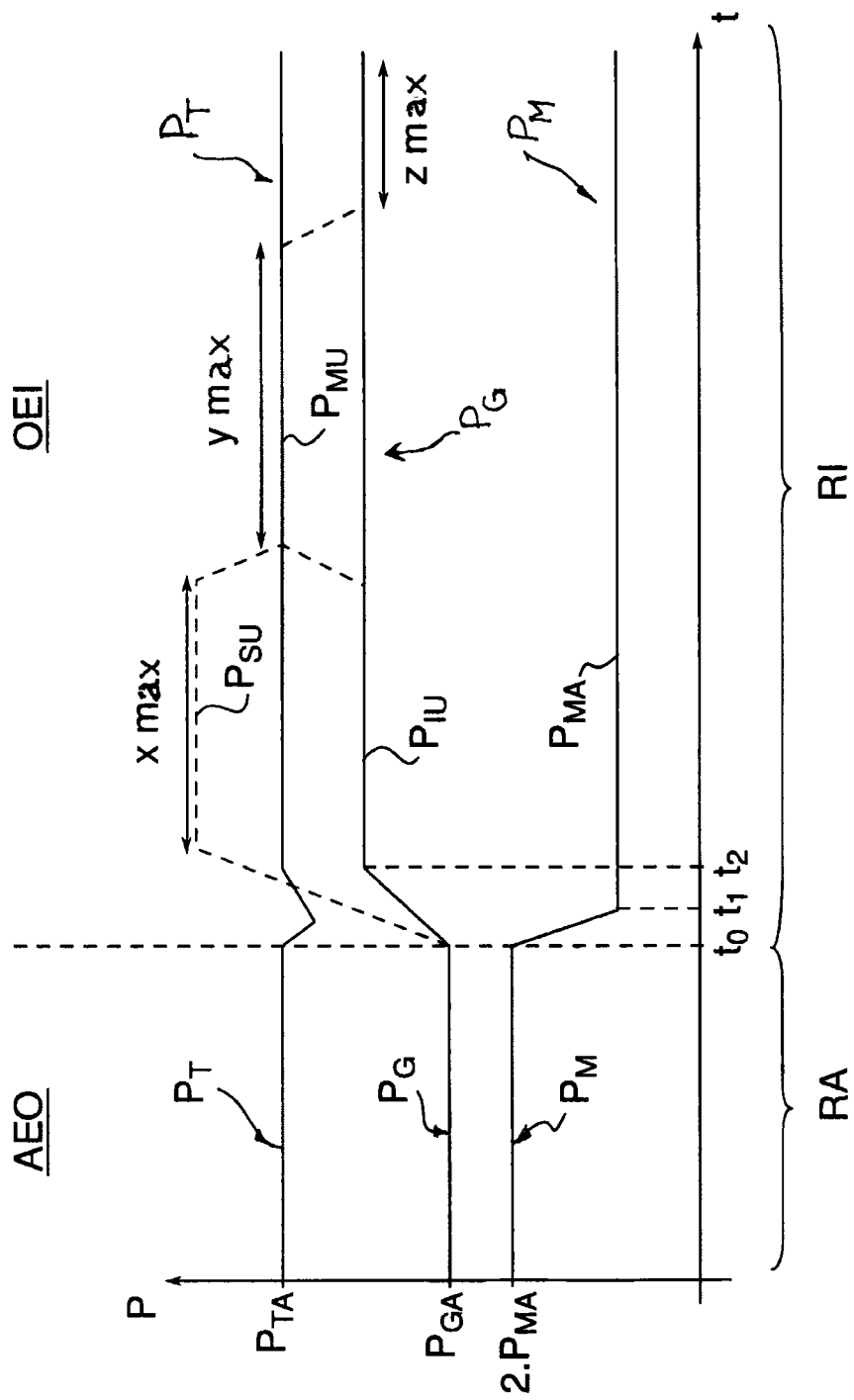
Figure 3:
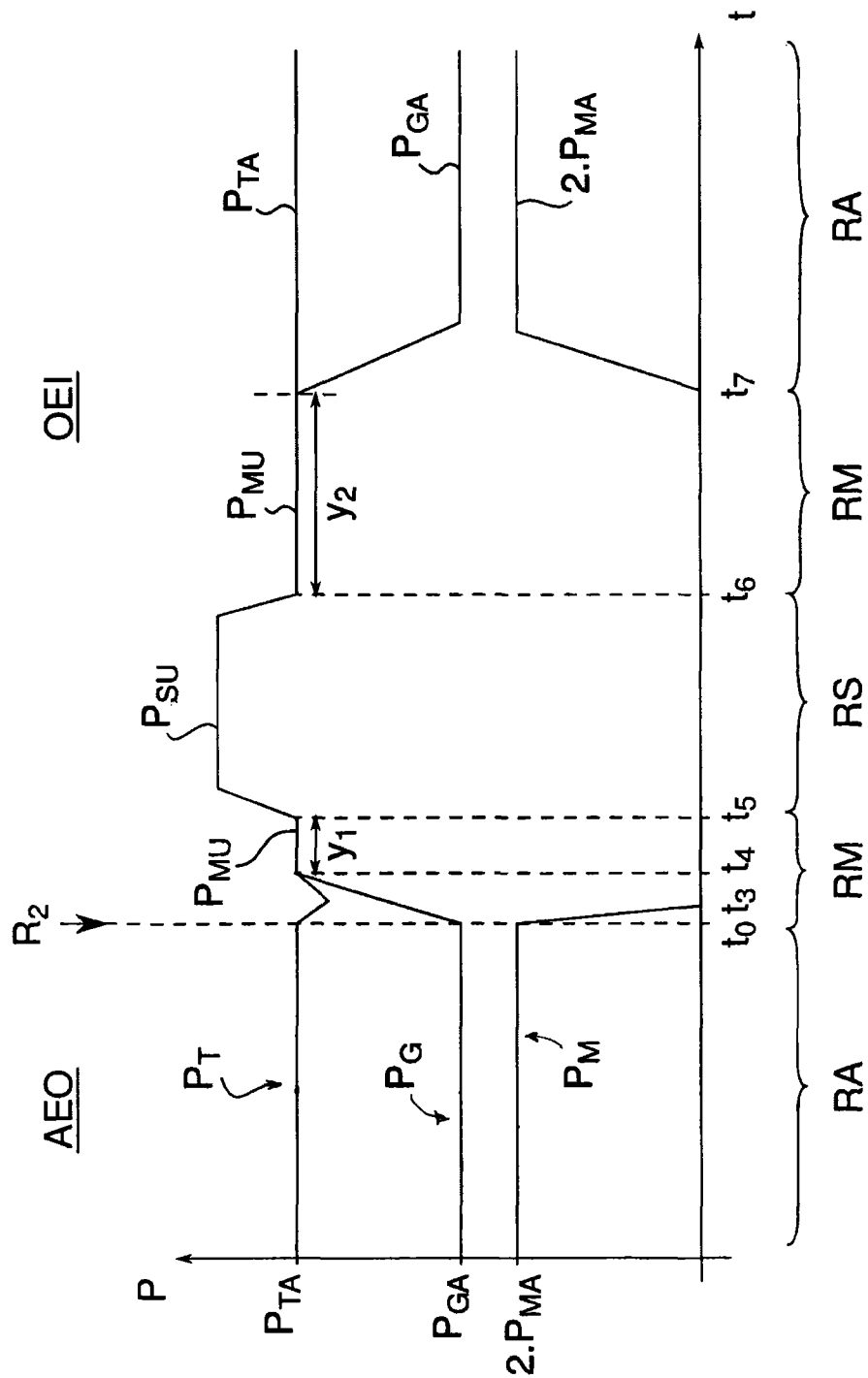
Figure 4:
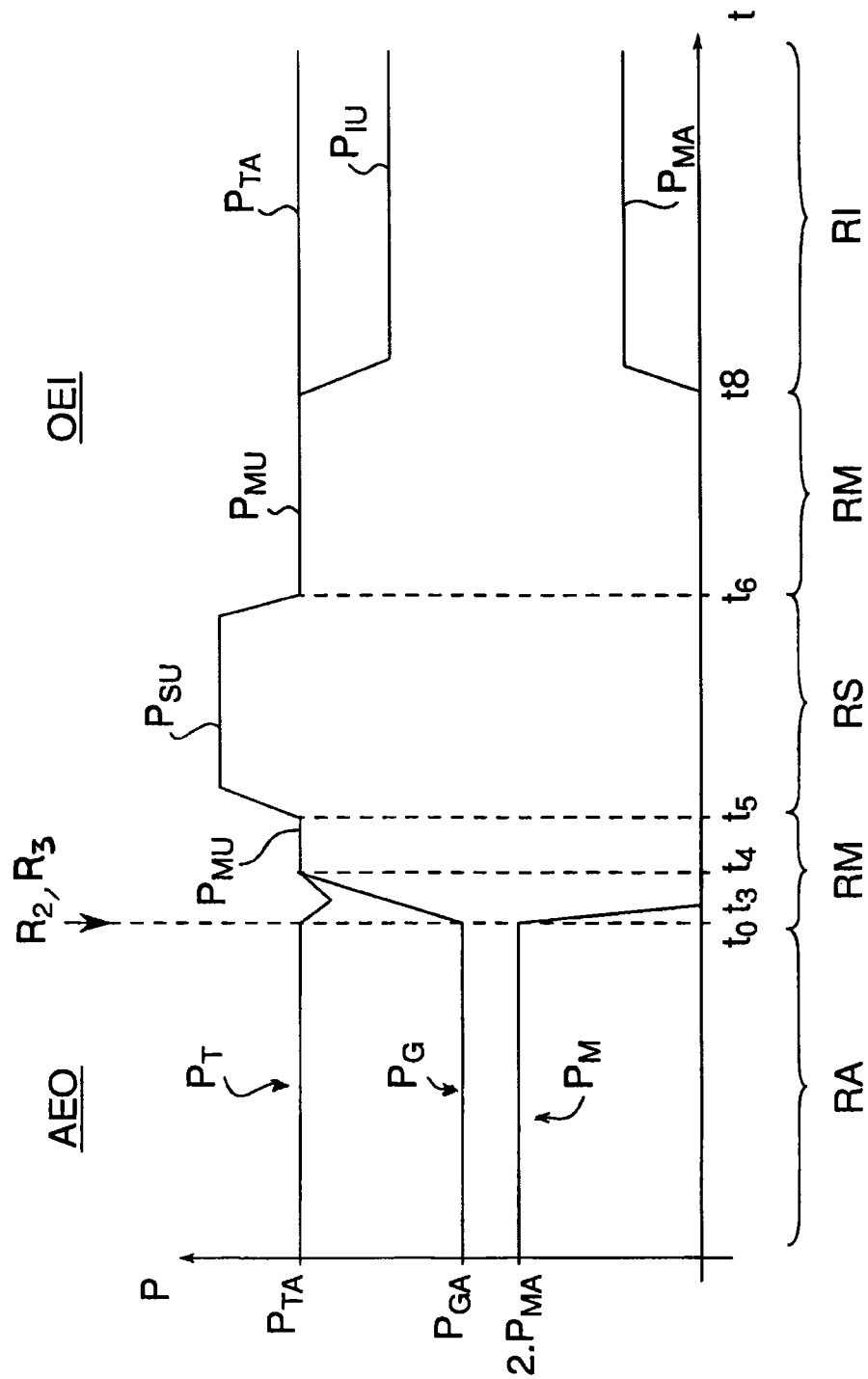
Figure 5:
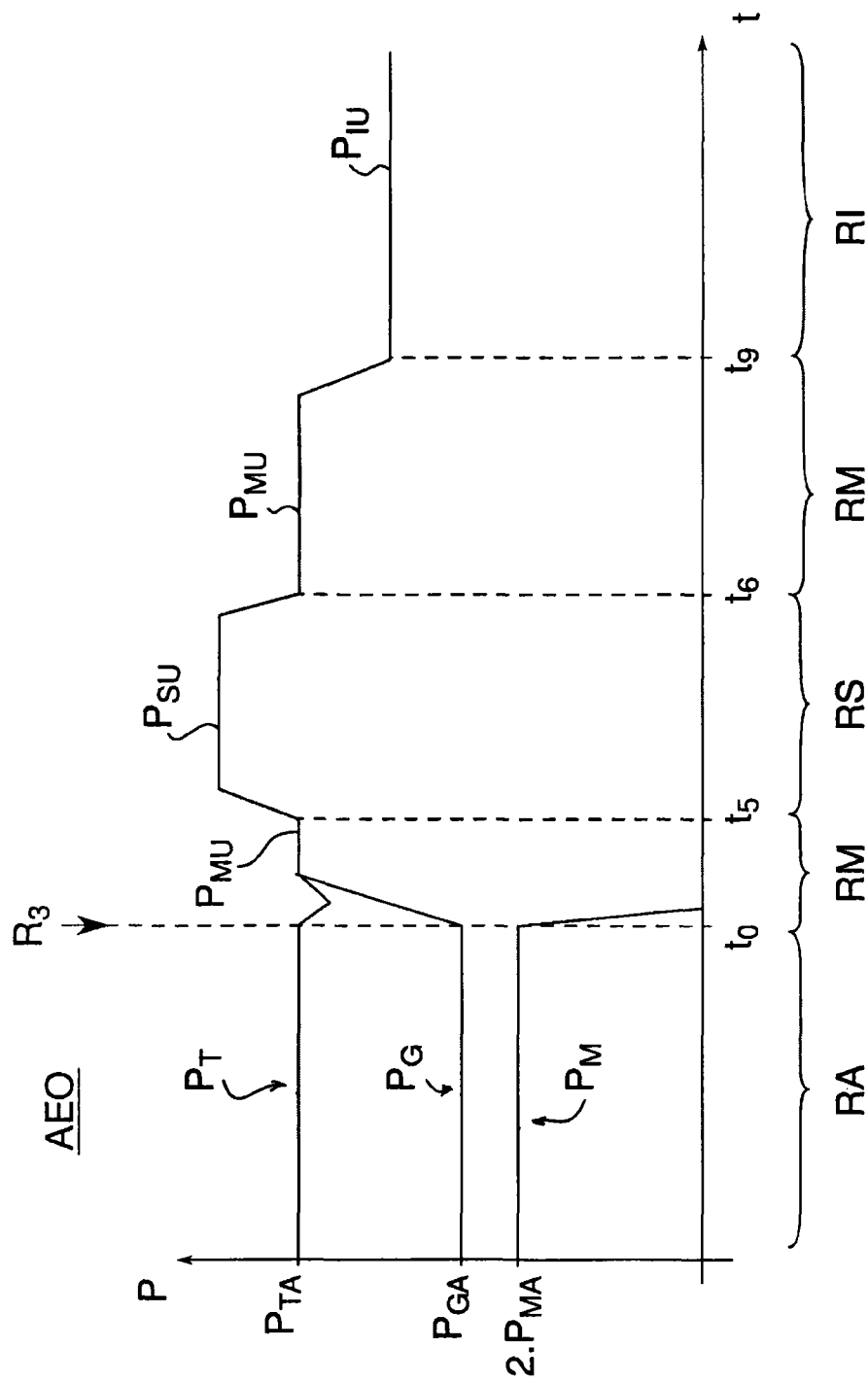

Other aspects, characteristics and advantages of the invention will become apparent from the following non-restrictive description, relating to particular embodiments, with reference to the appended drawings, which show, respectively:

in FIG. 1, a flow chart for the interactive equipment of a regulation system according to the invention;

in FIG. 2, an exemplary diagram of non-propulsive power management at the time of emergency regulation according to the invention in the event of losing an engine without attempting to restart that engine;

in FIG. 3, a diagram of this management at the time of the previous instance of regulation in the event of losing an engine and if the failed engine restarts after a restart attempt;

in FIG. 4, a diagram of emergency management by the previous instance of regulation if the failed engine does not restart after the attempt; this diagram also illustrates the emergency regulation of non-propulsive power in the event of losing two engines, when a failed engine restarts after one attempt; and in FIG. 5, a diagram of regulation in the event of losing two engines when the attempt to restart the engine is not successful.

DETAILED DESCRIPTION OF EMBODIMENTS

In all the FIGS. 2 to 5, the diagrams show how the non-propulsive power P develops on the basis of management systems covering the aeroplane's pneumatic and electrical power requirements, according to the time "t" in the course of the flight of a twin-engine aeroplane. Different variable levels of non-propulsive power are also indicated along the time axis, in corresponding time windows:

the non-propulsive power $P_M$ supplied by the traction system, here consisting of two turbojet engines, the engines having the references M1 and M2;

the power $P_G$ supplied by the GPP unit described above; and the total non-propulsive power $P_T$ supplied by the engines and the GPP unit, to take up all the power requirements (electrical and pneumatic).

In particular, they show the non-propulsive power of the main engines in nominal mode (known as "AEO" mode, the abbreviation of "all engines operating"): the $2P_{MA}$ power of the traction system formed by the main engines M1 and M2 ($P_{MA}$ for each of these engines) and also that of the main power unit, GPP, marked as $P_{GA}$.

The GPP unit is also capable of supplying different levels of additional power corresponding to different emergency regimes, successively or alternately as required, in the event of at least one main engine failure. The maximum operating periods in each emergency regime can be cumulated. The control centre conventionally comprises means for storing the data supplied, coupled to a central digital data processing unit, and also means for sending command signals to the engines and the GPP unit. This central processing unit also manages the power consumers and suppliers.

For example, the flow chart in FIG. 1 illustrates the path of emergency regulation "R", reflecting each instance of emergency regulation R1, R2 or R3 described below, carried by an emergency signal "S" and processed by an emergency function of a central digital data processing unit 100. In this example, the unit 100 is incorporated into the control centre known as aeroplane control 200. The data relate to the information from the control and monitoring modules known as "FADEC" 300 and 400 (the abbreviation of "Full Authority Digital Engine Control") of the main engines M1 and M2 of the main engines. The FADEC of a piece of equipment is a digital module that can control the latter throughout its power range. The emergency regulation signal "S" is sent to the GPP unit 700 via its FADEC 800. On receipt of the emergency signal, the FADEC 800 authorises the GPP unit to increase the power supplied by the GPP unit. The pilot 900 can also trigger commands "C" to the processing unit 100, to modify the distribution of non-propulsive power demands between the main engines M1 and M2 on the one hand, and the GPP unit 700 on the other hand, depending on the flight regimes.

Moreover, the FADECs 300, 400 and 800 are capable of supplying the pilot 900 and the maintenance module of the aircraft 950, via the processing unit 100 of the aeroplane control 200, with information "I" on the state of the engines and the GPP unit, and their ability to provide non-propulsive power. There are bidirectional links "L" to connect the various pieces of equipment mentioned.

The additional power that can be supplied by the GPP is illustrated in the diagrams in FIGS. 2 to 5 as follows:

super-emergency power $P_{SU}$, which allows all or some of the total non-propulsive power $P_T$ to be taken over, thus avoiding or minimising the relieving of demands of the aircraft's consumers while simultaneously being sufficient for an attempt to restart a failed main engine;

maximum emergency power $P_{MU}$, which also allows all or some of the total non-propulsive power $P_T$ to be taken over, thus avoiding or minimising the relieving of demands of the aircraft's consumers, but without attempting to restart a main engine, and intermediate emergency power $P_{IU}$, which allows a fraction of the total non-propulsive power to be taken over and can be supplied until the end of the flight, for example in ETOPS regimes.

The operating periods at the various emergency powers are limited so as to remain compatible with the acceptable limit of damage to the GPP unit. But these periods can be cumulated. For instance, if the GPP unit is called upon only at the intermediate emergency power level, the time that it might have devoted to supplying higher power is added to the maximum permitted time in the intermediate emergency regime.

In an exemplary embodiment, the power $P_{SU}$ reaches 130% of the nominal continuous operating power for $x_{max}=1$ minute, while the $P_{MU}$ is around 120% of the nominal continuous operating power for $y_{max}=2$ minutes, and the power $P_{IU}$ does not exceed 110% of the nominal continuous operating power for $z_{max}=180$ minutes. These maximum periods, during which the different regimes can be called upon, continuously or alternately, are dependent on the dimensions of the engines. In an exemplary embodiment, the periods are distributed as 35 seconds at power $P_{SU}$, 2 minutes and 15 seconds at power $P_{MU}$ (the 25 unused seconds at power $P_{SU}$ remain available in addition for the powers $P_{MU}$ and/or $P_{IU}$ and 110 minutes at power $P_{IU}$.

These additional powers are activated as detailed below, depending on the choices of whether or not to relieve the demands on the "surviving" (still operational) engine(s) according to different regulation modes in OEI operation. In particular, the time dedicated to each regime is counted by time counters 801 incorporated into the FADEC 800 of the GPP unit 700. This counting avoids damaging the GPP unit, which would otherwise be called upon for long periods in extreme power regimes. The power supplied by the GPP unit is also adjusted automatically by its FADEC in line with the power demands of the consumers. This adjustment is transparent to the pilot.

When at least one engine is lost, the data processing unit 200 sends an emergency signal "S" to the FADEC 800 of the GPP unit 700. This signal releases the authorisation for the GPP to make immediate use of the regimes RS, RM and RI corresponding respectively to the supply of power $P_{SU}$, $P_{MU}$ and $P_{IU}$. The regimes are shown on the abscissa in the appropriate time window, for given periods depending on consumption from the GPP unit 700, which consumption depends on the adjustment made by distributing the non-propulsive power between the GPP unit and the operational engine(s). This distribution is imposed by the processing unit 100 on the basis of the priorities defined by the aircraft manufacturer or on the orders of the pilot.

The priorities defined by the aircraft manufacturer can be given a hierarchy, e.g. using the following criteria:
- absolute priority given to flight safety: desired flight trajectory not yet reached or dangerous attitude of the aircraft requiring full availability of the propulsive power of the engine(s) that are still operational, while exceeding the time limits for using the emergency regimes of the GPP if flight safety is at stake;
- relative priority given to protecting equipment: time limits for using the emergency regimes of the GPP respected if the flight trajectory is once again satisfactory;
- priority given to consumption: optimisation of consumption for the end of the flight, which may lead to some consumers not considered essential being switched off.

Before the emergency signal "S" is sent, all the engines are operational and the non-propulsive power is in nominal AEO mode, in line with a nominal management regime RA, distributed as follows:
- the power $2P_{MA}$ supplied by the main traction system including the engines M1 and M2, where $P_{MA}$=150 kW;
- the power $P_{GA}$ supplied by the GPP unit, higher than the power $2P_{MA}$ supplied by the main traction system in the exemplary embodiment, for example $P_{GA}$=500 kW;
- the total non-propulsive power $P_{TA}$ supplied by the engines and the GPP unit to take up all the power requirements (electrical and pneumatic), this power therefore verifies: $P_{TA}=2P_{MA}+P_{GA}$.

As described in detail below, FIGS. 2 to 5 relate to the distribution of non-propulsive power at the time of emergency management in different modes. The following description also refers to the equipment, the pilot, the regulation, the signals and the links, organised as shown in FIG. 1, and keeping the same references. Reference should therefore also be made to FIG. 1 and the relevant text in connection with this description.

With reference to FIG. 2, this shows a diagram of non-propulsive power management P for emergency regulation in a mode R1. This mode is triggered by the signal "S" being sent at the time $t_0$, by the processing unit 100 of the control centre 200 if the left engine M1 fails and no attempt is made to restart this engine.

In this regulation mode R1, an intermediate emergency regime RI is directly and continuously required until the end of the flight, without using the super-emergency power $P_{SU}$ or the maximum emergency power $P_{MU}$, which remain potentially available (in dotted lines). The GPP unit 700 is thus called upon to supply intermediate emergency power $P_{IU}$, higher than the nominal power $P_{GA}$, but lower than the maximum emergency power $P_{MU}$. In this case, the surviving engine M2 is not relieved of its non-propulsive load, and it continues to supply its share $P_{MA}$ of non-propulsive power.

The intermediate power supplied as from the moment $t_2$ and the non-propulsive power $P_{MA}$—supplied as from the moment $t_1$ solely by the still operational right engine M2—then constitute the total non-propulsive power $P_T$ in this flight phase between receipt of the emergency signal "S" by the FADEC of the GPP unit 700 and the end of the flight. This total power $P_T$ is substantially equal to the total non-propulsive power $P_{TA}$ in the nominal regime mode RA. The level of emergency power $P_{IU}$ supplied thus corresponds to taking up the fraction of the total non-propulsive power that the GPP unit 700 is capable of supplying constantly until the end of the flight in ETOPS regimes. The activation period of the GPP unit 700 in the regime RI thus includes the possible activation periods of the super-emergency RS ($x_{max}$) and maximum emergency RM ($y_{max}$) regimes at the intermediate power level $P_{IU}$, as well as the period ($z_{max}$) dedicated to the intermediate emergency regime RI.

FIG. 3 illustrates a diagram of non-propulsive power management P for emergency regulation in a mode R2. This mode is triggered by the emergency signal "S" being sent at the time $t_0$, by the processing unit of the control centre 200 in the case where the left engine M1 having failed as in the previous case, an attempt to restart this engine is called upon.

Before the emergency signal "S" is sent at the time that the left engine M1 stops, the non-propulsive power is distributed, in the nominal regime RA in AEO mode, in the same configuration as in FIG. 2.

In this regulation mode R2, the right engine M2, which is still operational, is relieved of its non-propulsive load—with complete relief as from the time $t_3$—so as to have more propulsive power available to it temporarily. The aircraft control centre 200 manages the command to relieve demands in accordance with the emergency regulation mode R2, via the emergency function. This function is provided by a programmed processor and incorporated into the processing unit of the aircraft control centre.

In general, this function generates the emergency signals automatically and manages the distribution of non-propulsive power between the GPP and operational engine(s), either automatically as per preferred choices made initially by the aircraft manufacturer and incorporated into the emergency function—as in the example described above—or by pilot intervention.

On receipt of the emergency signal "S" by the FADEC of the GPP unit, the engine remaining operational M2 is relieved of demands and the non-propulsive power is then supplied as compensation by the GPP unit as follows. The emergency function first places the FADEC of the GPP unit in a state of alert so that it increases the operational limits of the GPP to make it capable of undergoing an imminent increase in load. The processing unit 100 then switches the power transport means of the engine M2 to the GPP unit as ordered by the pilot or according to the programmed automatic rules. At the time $t_3$, the load carried by the GPP unit increases abruptly. To respond to this additional load, the gas generator of the GPP unit is accelerated. The GPP unit then supplies more non-propulsive power than in the previous phase. The gas generator of the GPP unit is thus accelerated to reach the maximum emergency regime RM level of power $P_{MU}$ at the time $t_4$. This power level is capable of compensating for the engine M2 being relieved of its load of supplying non-propulsive power, and for the failure of the engine M1. In these circumstances, all the non-propulsive power $P_T$ is supplied by the GPP unit as from the time $t_3$, where the level $P_G$, here $P_{MU}$ between the times $t_4$ and $t_5$, is held substantially at the nominal level $P_{TA}$ as from the time $t_4$.

After a given period of time y1 of operation in this maximum emergency regime RM (which period can be reduced or eliminated if necessary), for example equal to 10 seconds, the pilot gives a command to the processing unit of the control centre, at the time $t_5$, to attempt to restart the left main engine M1. The control centre 200 then requests the FADEC 800 of the GPP unit 700 to switch to start mode of the engine M1. The GPP unit accelerates its gas generator further so as to have super-emergency power $P_{SU}$, comprising the power necessary for restarting. The GPP unit thus almost instantaneously reaches the super-emergency regime RS, in which this unit supplies all the non-propulsive power at the nominal level $P_{TA}$ plus the power for restarting the left engine M1.

The diagram in FIG. 3 corresponds to the case where the failed engine M1 restarts following said attempt. After having made use of all the power required for restarting, for a period x1 of 35 seconds, the GPP unit 700 switches back, at the time $t_6$, to the maximum emergency regime RM corresponding to the power $P_{MU}$. This regime can last until the end of the remainder y2 (equal to the difference (y−y1)) of the maximum period "y" (2 minutes) allocated to that regime, plus the residual time (x−x1) permitted but not used in the super-emergency regime RS (maximum duration "x" equal to 1 minute). The maximum emergency regime RM can therefore last for ((y+x)−(y1+x1)) i.e., in the example, 2 minutes and 15 seconds.

However, when circumstances at the time $t_7$ require the main engines M1 and M2 to supply their share of non-propulsive power $2P_{MA}$ in AEO mode, the emergency function, either automatically or at the request of the pilot, once again adjusts the supply of non-propulsive power over the main engines and the GPP unit. This GPP unit then switches, at that time $t_7$, to nominal power supply regime RA and the power supplied by this unit goes back to the level $P_{GA}$.

The diagram in FIG. 4 corresponds to the emergency case illustrated in FIG. 3 but where the attempt to restart the failed engine M1 is unsuccessful. The reference signs in FIG. 4 then relate to the parts of the description referring to FIG. 3. In the alternative case of FIG. 4, the surviving engine M2 switches back to supplying nominal non-propulsive power $P_{MA}$ when the pilot considers, as from a time $t_8$, that the flight regimes so permit. The GPP unit then switches simultaneously, at that time $t_8$, to intermediate emergency regime RI with power $P_{IU}$, corresponding to the power level that the GPP unit is capable of supplying until the end of the flight.

FIG. 4 also illustrates a diagram of non-propulsive power management P for emergency regulation in a mode R3 corresponding to the simultaneous failure of the two engines M1 and M2. An emergency signal "S", produced by the emergency function and sent at the time $t_0$ by the processing unit of the control centre, is received by the FADEC of the GPP unit.

In this case, all of the non-propulsive power is supplied by the GPP unit as in the previous case. On receipt of the emergency signal "S", all of the non-propulsive power $P_T$ consumed is generated by the GPP unit by accelerating its gas generator until it reaches the maximum emergency regime RM level of power $P_{MU}$. The GPP unit is then capable of compensating for the failure of the engines M1 and M2. In these circumstances, all the non-propulsive power $P_T$ is supplied by the power $P_G$ of the GPP unit as from the time $t_3$, at a level substantially equal to the nominal level $P_{TA}$.

After the operating period in this maximum emergency regime RM, which can be reduced or even eliminated if an engine needs to be restarted as quickly as possible, the pilot gives a command to the control centre, at the time $t_5$, to attempt to restart an engine, for example the engine M2. The processing unit of that centre then requests the FADEC of the GPP unit to switch to start mode for the engine M2. The GPP unit the accelerates its gas generator further so as then to have the super-emergency power $P_{SU}$ available, comprising the power necessary for restarting and the power to supply all the non-propulsive power at the nominal level $P_{TA}$. Two situations are then managed, depending on whether or not the engine M2 restarts.

The diagram in FIG. 4 corresponds to the case where the failed engine M2 restarts following the attempt. After having made use of all the power required for restarting, the GPP unit switches back, as from the time $t_6$, to the maximum emergency regime RM corresponding to the power $P_{MU}$ for as long as the engine M2 is not supplying any non-propulsive power.

When the flight conditions so permit, the pilot decides at the time $t_7$ not to relieve the demands on the engine M2 any longer. The emergency function of the aeroplane control centre 200 then allows the engine M2 to supply its share of non-propulsive power $P_{MA}$ once again. And the GPP unit slows down its gas generator, at the same time as the time $t_7$, to intermediate regime RI with power $P_{IU}$, so that the total non-propulsive power $P_T$ remains substantially at the nominal level $P_{TA}$.

The power $P_{IU}$ takes up the fraction of non-propulsive power that the GPP unit is capable of supplying until the end of the flight. This power $P_{IU}$ remains higher than the power at the nominal level $P_{GA}$, so as to compensate for the lack of non-propulsive power supplied by the failed engine M1.

The diagram in FIG. 5 takes up that in FIG. 4 but corresponds to the alternative case where the failed engine M2 does not restart during the attempt, and the two engines remain failed. In this case, at the end of operating the super-emergency regime RS, the GPP unit, having returned to the regime RM with maximum power $P_{MU}$ as from the time $t_6$, stays in that regime RM until the period allowed for that regime has elapsed. Next, at the time $t_9$, the emergency function reduces the consumption of non-propulsive power from the GPP unit, which at that time switches to the regime RI of intermediate emergency power $P_{IU}$, reducing the supply of non-propulsive power accordingly.

The processing unit takes account of the information that the limits of the periods—x, y and z—of the regimes RS, RM and RI have been reached. This information is supplied by the FADEC of the GPP unit and the emergency function of the aeroplane control centre 200 then reduces the power consumption of the GPP unit at the appropriate times—here at the time $t_9$—for example in accordance with the priorities provided above, by toggling from one regime to another at those times.

To increase the supply of non-propulsive power, the aircraft is equipped with a RAT-type (ram air) turbine. This is a small or "micro-aeolian" turbine connected to a hydraulic pump or electricity generator.

The invention is not limited to the examples described and illustrated. It is, for example, possible to envisage other scenarios that would, for example, combine all or some of the instances of regulation R1 to R3 set out above. Moreover, other additional power regimes supplied by the GPP unit can be defined, for example by providing several intermediate power levels.

The invention claimed is:

1. A method for regulating power in event of failure of at least one aircraft engine including a central digital data processing unit providing an emergency function capable of triggering an emergency signal, the method comprising:
   using an engine-class main power unit, as a GPP, managed by a control and monitoring function and operating constantly in flight, while taking up some of nominal total non-propulsive power of an aircraft, to extend its operational limits on receipt of the emergency signal to be able to supply increased non-propulsive power instantaneously, based on at least three emergency regimes at a time of an engine failure in response to increased consumption demands on the GPP, each emergency regime having a maximum activation period, which is carried over from one regime to another regime and is distributed over plural alternate sequences,
   wherein the regimes comprise, classified in order of decreasing power level, a super-emergency regime, in which all or some of the non-propulsive power, plus additional power, is taken over to attempt to restart the failed engine, a maximum emergency regime, in which all or some of the non-propulsive power is taken over, and an intermediate emergency regime, in which a fraction of non-propulsive power is taken over, corresponding to power remaining constantly available up to an end of the flight,
wherein the control and monitoring function of the GPP calculates an elapsed time for each emergency regime and informs the central processing unit thereof, while emitting an alarm when maximum operating periods allocated to each emergency regime are exceeded, and
wherein the emergency function adjusts the non-propulsive power demands made by the aircraft between main engines and the GPP, either automatically or on orders of a pilot, based on information about elapsed time in a regime and a warning that a limit for using one of the at least three emergency regimes has been exceeded.

2. The regulation method according to claim 1, wherein the super-emergency regime is reached only in a phase of attempting to restart an engine while simultaneously supplying all or some of the non-propulsive power of the aircraft, the maximum emergency regime is reached when one or more engines has failed, while simultaneously supplying all or some of the non-propulsive power of the aircraft, and the intermediate emergency regime is activated only in a phase of maintaining a fraction of the total non-propulsive power, in event that at least one engine fails completely during an end-of-flight period, by relieving demands on remaining operational engines.

3. The regulation method according to claim 1, wherein, in event of a failure of just one of the at least one aircraft engine that supplies non-propulsive power when operational, a regulation mode comprises calling upon only an intermediate emergency regime of the GPP, to compensate for lack of contribution from the failed engine while any operational engine is not relieved of its contribution to total non-propulsive power.

4. The regulation method according to claim 1, wherein, in event of a failure of just one of the at least one aircraft engine that provides non-propulsive power when operational, a regulation mode comprises calling upon three regimes successively and alternately, with any operational engine being relieved of its contribution to the non-propulsive power until the failed engine has restarted for an alternative sequence of maximum emergency regime in which at least some of the non-propulsive power is taken over, followed by a demand for power corresponding to the super-emergency regime when an attempt is made to restart the failed engine for no longer than a whole available period allocated to that regime, before reverting to the maximum emergency regime with the total non-propulsive power being taken over as before, it being possible for the maximum emergency regime to last until an available period allocated to that regime has elapsed.

5. The regulation method according to claim 4, wherein, when the failed engine is restarted, the emergency function adjusts the non-propulsive power between two engines and the GPP, which operate again in the restored nominal non-propulsive power regime until an end of the flight, with a given portion of that power supplied by the GPP and the additional portion supplied by the two engines.

6. The regulation method according to claim 4, wherein, when the failed engine does not restart, the emergency function stops relieving demands on the operational engine, restoring its contribution to the non-propulsive power at that time, either automatically based on the flight data or on orders of the pilot when the pilot considers that the flight regimes so permit, and calls upon the GPP unit in the intermediate emergency regime until the end of the flight.

7. The regulation method according to claim 4, wherein, when two engines have failed, a regulation mode of the emergency function comprises calling upon the alternative sequence, activating the maximum emergency regime, followed by the super-emergency regime while an attempt is made to restart the engine, before returning to the maximum emergency regime.

8. The regulation method according to claim 7, wherein, when the engine is restarted, and either on orders of the pilot when the pilot considers that the flight regimes so permit, or automatically on the basis of the flight data, the emergency function diverts some consumers to the restarted engine, which supplies its share of non-propulsive power, and other consumers to the GPP, which operates in the intermediate emergency regime until the end of the flight.

9. The regulation method according to claim 7, wherein, when the engine does not restart after the attempt, the maximum emergency regime is called upon until its activation period has elapsed, then the demand for non-propulsive power is reduced by the emergency function so as to switch to the intermediate emergency regime.

10. A system for regulating power in event of failure of at least one aircraft engine, comprising:
an aircraft flight control including a digital data processing unit, an aircraft maintenance module, and control and monitoring modules as FADECs for the GPP and for the engines,
wherein the FADEC of the GPP includes elapsed time counters for emergency regimes triggered by an emergency function of the digital data processing unit, which adjusts a supply of non-propulsive power by the GPP and engines via their FADECs,
wherein bidirectional links connect an aircraft control center to the FADECs and the FADECs to the GPP and to the engines, so that they can manage demand from consumers based on the elapsed times and information on a state of the engines and the GPP, supplied by the FADECs to the aircraft a maintenance module and to the pilot via the digital data processing unit, by implementing the method according to claim 1.

* * * * *